(12) United States Patent
Paskell et al.

(10) Patent No.: US 8,132,664 B2
(45) Date of Patent: Mar. 13, 2012

(54) PRODUCT HOLDING PUCK WITH NOISE REDUCING BUMPERS

(75) Inventors: Kirk Paskell, Erie, PA (US); Bruce Cleevely, Middletown, PA (US)

(73) Assignee: Avantage Puck Technologies, Inc., Cleveland, OH (US)

( * ) Notice: Subject to any disclaimer, the term of this patent is extended or adjusted under 35 U.S.C. 154(b) by 35 days.

(21) Appl. No.: 12/847,291

(22) Filed: Jul. 30, 2010

(65) Prior Publication Data

US 2012/0024673 A1 Feb. 2, 2012

(51) Int. Cl.
*B65G 13/02* (2006.01)
(52) U.S. Cl. ............................. 198/803.14; 198/867.11
(58) Field of Classification Search ............... 198/477.1, 198/803.14, 867.11, 867.14, 867.15
See application file for complete search history.

(56) References Cited

U.S. PATENT DOCUMENTS

| | | | |
|---|---|---|---|
| 3,941,237 A | 3/1976 | MacGregor, Jr. | |
| 5,484,052 A | 1/1996 | Pawloski et al. | |
| 5,769,203 A * | 6/1998 | Marti Sala | 198/397.01 |
| 5,897,090 A * | 4/1999 | Smith et al. | 248/311.2 |
| 6,068,110 A * | 5/2000 | Kumakiri et al. | 198/803.14 |
| 6,176,369 B1 | 1/2001 | Petrovic | |
| 6,311,830 B1 | 11/2001 | Grimm | |
| 6,522,945 B2 | 2/2003 | Sleep et al. | |
| 6,971,506 B2 * | 12/2005 | Hassinen et al. | 198/803.14 |
| 8,047,359 B2 * | 11/2011 | Fellows et al. | 198/867.11 |

OTHER PUBLICATIONS

Six (6) pages of ten (12) photographs of a product holding puck (Product No. 6166) manufactured by assignee Advantage Puck Technologies, LLC, Corry, PA 16436. The product holding puck includes a total of four grommets, made of SANTOPRENE thermoplastic elastomer, rubber, or similar material, with two of the grommets inserted through two diagonally positioned openings in an outer wall of one of the short sides of the product holding puck and two of the grommets inserted through two diagonally positioned openings in the outer wall of the other of the short sides of the product hold puck. Heads of the grommets extend outwardly from the outer wall. The four (4) photographs on pp. 5 and 6 show one of the grommets removed from its respective opening in order to more clearly show the grommet and the opening. Applicants' state that the product holding puck shown in the photographs is prior art to Applicants' invention.

(Continued)

*Primary Examiner* — James R Bidwell
(74) *Attorney, Agent, or Firm* — Tarolli, Sundheim, Covell & Tummino LLP

(57) ABSTRACT

A product holding puck having a base including an outer wall and a radially spaced apart inner wall defining a cavity between the outer and inner walls, the outer and inner walls extending axially about a central vertical axis. The outer wall of the puck defining first and second recessed regions and first and second openings respectively aligned with the first and second recessed regions and extending through the outer wall. The puck further including first and second bumpers each including a body and a support member, the support member extending axially through a respective ones of the first and second openings of the outer wall and the body disposed in a respective ones of the first and second recessed regions of the outer wall, the body of each of the first and second bumpers including an outer face extending radially outwardly of an outer surface of the outer wall.

20 Claims, 9 Drawing Sheets

OTHER PUBLICATIONS

Three (3) pages of six (6) photographs of a product holding puck (Product No. 6137) manufactured by assignee Advantage Puck Technologies, LLC, Corry, PA 16436. Applicants' state that the product holding puck shown in the photographs is prior art to Applicants' invention.

Twelve (12) pages of twelve (12) print outs of photographs of a product holding puck (Product No. 6166) manufactured by assignee Advantage Puck Technologies, LLC Corry, PA 16436. These print outs are print outs of the photographs described in item one (1) listed above. Applicants' state that the product holding puck shown in the print outs is prior art to Applicants' invention.

Six (6) pages of six (6) print outs of photographs of a product holding puck (Product No. 6137) manufactured by assignee Advantage Puck Technologies, LLC, Corry, PA 16436. These print outs are print outs of the photographs described in item two (2) listed above. Applicants' state that the product holding puck shown in the print outs is prior art to Applicants' invention.

\* cited by examiner

US 8,132,664 B2

PRODUCT HOLDING PUCK WITH NOISE REDUCING BUMPERS

TECHNICAL FIELD

The present disclosure relates to a product holding puck used to holding a product container in an upright position for product filling and/or labeling purposes as the container moves along a product filling and/or labeling line and, in particular a product holding puck that includes noise reducing pieces or bumpers that extend radially outwardly beyond an outer wall of the puck.

BACKGROUND

Product holding pucks, sometimes referred to as product carriers, are used, typically in automated production line, such as product filling and/or labeling lines, to hold containers in a desired orientation, e.g., an upright position, for product filling and/or labeling as the container moves along the line. For example, containers to be filled with shampoo, soaps, tanning oils, etc., are often unstable and subject to tipping. Utilizing a product holding puck to hold the container in a desired orientation as it moves along the production increases the stability of the container for product filling and labeling purposes.

At the start of an automated production line, an empty container is inserted in a product holding puck at an inbound staging area. The puck, supporting the container in an upright position, moves through processing stations of the production line. As the puck and container combination moves along the production line, at different processing stations different tasks are performed, for example, processing stations may perform the following functions, among others, the container may be filled with one or more products, the container may have a cap or top applied, a tamper-resistant seal may be applied over the container opening and/or the cap, one or more labels may be applied, indicia may be printed on the label or the container, etc. When processing is complete and the puck and container are moved to an outbound staging area, the container is removed from the puck and the puck is rerouted back to the inbound staging area for reuse.

The "footprint", that is, the size and configuration of the outer wall of the product holding puck can be standardized for many different size containers. For example, two different pucks may be used to, for example, support a 16 oz. shampoo container and a 20 oz shampoo container. The two pucks can be designed to have the same size and shape of their respective outer wall configuration. Thus, from the view of the transfer equipment of the production line, even though one puck supports a 16 oz. shampoo container and the other puck supports a 20 oz. shampoo container, the two pucks are identical. That is, on one shift of the production line, the 16 oz. shampoo containers may be filled and, if desired, on the next shift of the production line, the 20 oz. shampoo containers may be filled without the need for any changes to the conveyor guide rails, star wheels, or timing screws.

Thus, utilizing pucks having the same "footprint", different shapes and sizes of product containers may be supported, filled and/or labeled without the need for changeover of transfer equipment of the production line. That is, from the view of the transfer equipment of the production line, the puck is the item to be moved from along the line, the container is merely an appendage of the puck. Further, pucks may be designed with different heights and the position of the container support structure of the puck may be varied such that, for example, the product filling opening of the container is at a predetermined position with respect to an outer wall of the puck and at a predetermined height above a bottom surface of the puck.

Pucks are typically fabricated of a hard plastic material for durability purposes. Pucks are not only subject to the rough handling of a production line but, additionally, as product is invariably spilled onto the pucks during container filling and capping operations, the pucks must frequently be washed. Depending on the nature of the product or products to be introduced into the container, washing may require use of hot water and detergents, thus, the puck has be impervious to repeated washings with hot water and detergents.

During movement along conveyors, at the filling stations, and in the inbound and outbound staging areas, the pucks tend to collide with each other. As the, collisions between the hard plastic pucks generate a substantial amount of undesirable noise. Given that depending on the size and capacity of the production line, hundreds or thousands of pucks may be moving along the line at any given time, the noise generated by puck-on-puck collisions can be substantial. Employees working at the processing stations or overseeing the production line are constantly subject to noise generated by puck-on-puck collisions, in addition to the noise necessarily generated by the production line. Noise is undesirable as it complicates oral communication between employees. Additionally, from an ergonomic point of view, reducing a level of noise that employees are subjected to is always desirable. Noise may contribute to stress, inability to concentrate, etc.

What is needed is a product holding puck that is both durable and that has noise damping or noise reduction capability or features.

SUMMARY

In one aspect, the present disclosure relates to a product holding puck including: a base including an outer wall and a radially spaced apart inner wall defining a cavity between the outer and inner walls, the outer and inner walls extending axially about a central vertical axis, the outer wall being radially outwardly of the inner wall, an outer surface of the outer wall defining at least one opening aligned with the at least one recessed region and extending through the outer wall; at least one bumper including a body and a support member, the support member extending axially through the at least one opening of the outer wall and the body including an outer face that extends radially outwardly of the outer surface of the outer wall; and potting material disposed in the cavity, the potting material contacting the support member of the at least one bumper to positionally secure the at least one bumper with respect to the base.

In one exemplary embodiment, the outer surface of the outer wall includes at least one recessed region, the at least one opening aligned with the at least one recessed region. In one exemplary embodiment, a portion of the body of the at least one bumper facing the outer wall is disposed in the at least one recessed region.

In one exemplary embodiment, the at least one recessed region includes a first recessed region and a circumferentially spaced apart second recessed region; the at least one opening includes a first opening aligned with the first recessed region and a second opening aligned with the second recessed region. In one exemplary embodiment, the at least one bumper includes a first bumper and a circumferentially spaced apart second bumper, the first bumper including a first body and a first support member, the first support member extending radially through the first opening of the outer wall and a portion the first body facing the outer wall disposed in the first recessed region of the outer surface of the outer wall, the first body of the first bumper including a first outer face that extends radially outwardly of the outer surface of the outer wall and the second bumper including a second body and a second support member, the second support member extending radially through the second opening of the outer wall and a portion of the second body facing the outer wall disposed in the second recessed region of the outer surface of the outer wall, the second body of the second bumper including a second outer face that extends radially outwardly of the outer surface of the outer wall.

In one exemplary embodiment, the outer wall when viewed in top plan view is generally rectangular with respect to a central longitudinal horizontal axis that is orthogonal to the central vertical axis, the central longitudinal horizontal axis being substantially parallel to longer first and second sides of the outer wall and substantially orthogonal to shorter third and fourth sides of the outer wall and further wherein the first recessed region is formed in the shorter third side of the outer wall and the second recessed region is formed in the shorter fourth side of the outer wall. In one exemplary embodiment the first outer face of the first bumper extends radially outwardly of an outer surface of the shorter third side of the outer wall and the second outer face of the second bumper extends radially outwardly of an outer surface of the shorter fourth side of the outer wall.

In one exemplary embodiment, the shorter third and fourth sides of the outer wall each define respective regions of increased radial thickness and each of the respective first and second openings include three axially extending apertures that extend axially through the respective regions of increased radial thickness and each of the first and second bumper support members including three arms extending axially through respective ones of the three apertures. In one exemplary embodiment, the outer wall when viewed in top plan view is generally rectangular with respect to a central longitudinal horizontal axis that is orthogonal to the central vertical axis, the central longitudinal horizontal axis being substantially parallel to longer first and second sides of the outer wall and substantially orthogonal to shorter third and fourth sides of the outer wall.

In one exemplary embodiment, the shorter third and fourth sides of the outer wall each include a guide rail recess extending substantially orthogonally to the radial longitudinal axis. In one exemplary embodiment, a durometer hardness scale value of the at least one bumper is lower than a durometer hardness scale of the base. In one exemplary embodiment, a durometer hardness scale value of the potting material is lower than a durometer hardness scale value of the base.

In one exemplary embodiment, a plurality of ribs extend between an inner surface of the outer wall and an outer surface of the inner wall. In one exemplary embodiment, the plurality of ribs extend axially from an upper surface of the outer wall to a lower surface of the inner wall of the base.

In one exemplary embodiment, an upper portion of the inner wall includes a radially extending product support platform. In one exemplary embodiment, an upper portion of the inner wall includes a pair of generally vertically extending product stabilizing uprights.

In another aspect, the present disclosure relates to a product holding puck including: a base including an outer wall and a radially spaced apart inner wall defining a cavity between the outer and inner walls, the outer and inner walls extending axially about a central vertical axis, the outer wall being radially outwardly of the inner wall and defining at least one recessed region and at least one opening respectively aligned with the at least first recessed region and extending through the outer wall; at least one bumper including a body and a support member, the support member extending axially through the at least one opening of the outer wall and wall body including an outer face that extends radially outwardly of the outer surface of the outer wall; and potting material disposed in the cavity and extending through the outer wall to define at least one bumper including a body and a support member, the support member extending axially through the at least one opening of the outer wall and the body disposed in the at least one recessed region of the outer wall, the body of the at least one bumper including an outer face that extends radially outwardly of the outer surface of the outer wall.

In one exemplary embodiment, the at least one recessed region includes a first recessed region and a circumferentially spaced apart second recessed region, the at least one opening includes a first opening aligned with the first recessed region and a second opening aligned with the second recessed region; and the at least one bumper includes a first bumper and a second bumper spaced circumferentially apart, the first bumper including a first body and a first support member, the first support member extending axially through the first opening of the outer wall and the first body disposed in the first recessed region of the outer surface of the outer wall, the first body of the first bumper including a first outer face that extends radially outwardly of the outer surface of the outer wall and the second bumper including a second body and a second support member, the second support member extending axially through the second opening of the outer wall and the second body disposed in the second recessed region of the outer surface of the outer wall, the second body of the second bumper including a second outer face that extends radially outwardly of the outer surface of the outer wall.

In one exemplary embodiment, an upper portion of the inner wall includes a radially extending product support platform. In one exemplary embodiment, an upper portion of the inter wall includes a pair of generally vertically extending product stabilizing uprights.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to a product holding puck used to holding a product container in an upright position for product filling and/or labeling purposes as the container moves along a product filling and/or labeling line and, in particular a product holding puck that includes noise reducing pieces or bumpers that extend radially outwardly beyond an outer wall of the puck. The product holding puck of the present disclosure also advantageously includes noise reducing potting material disposed within a cavity defined by the puck. In a first exemplary embodiment, the noise reducing bumpers are separately extruded components which are held in place by the potting material.

Figure 1:
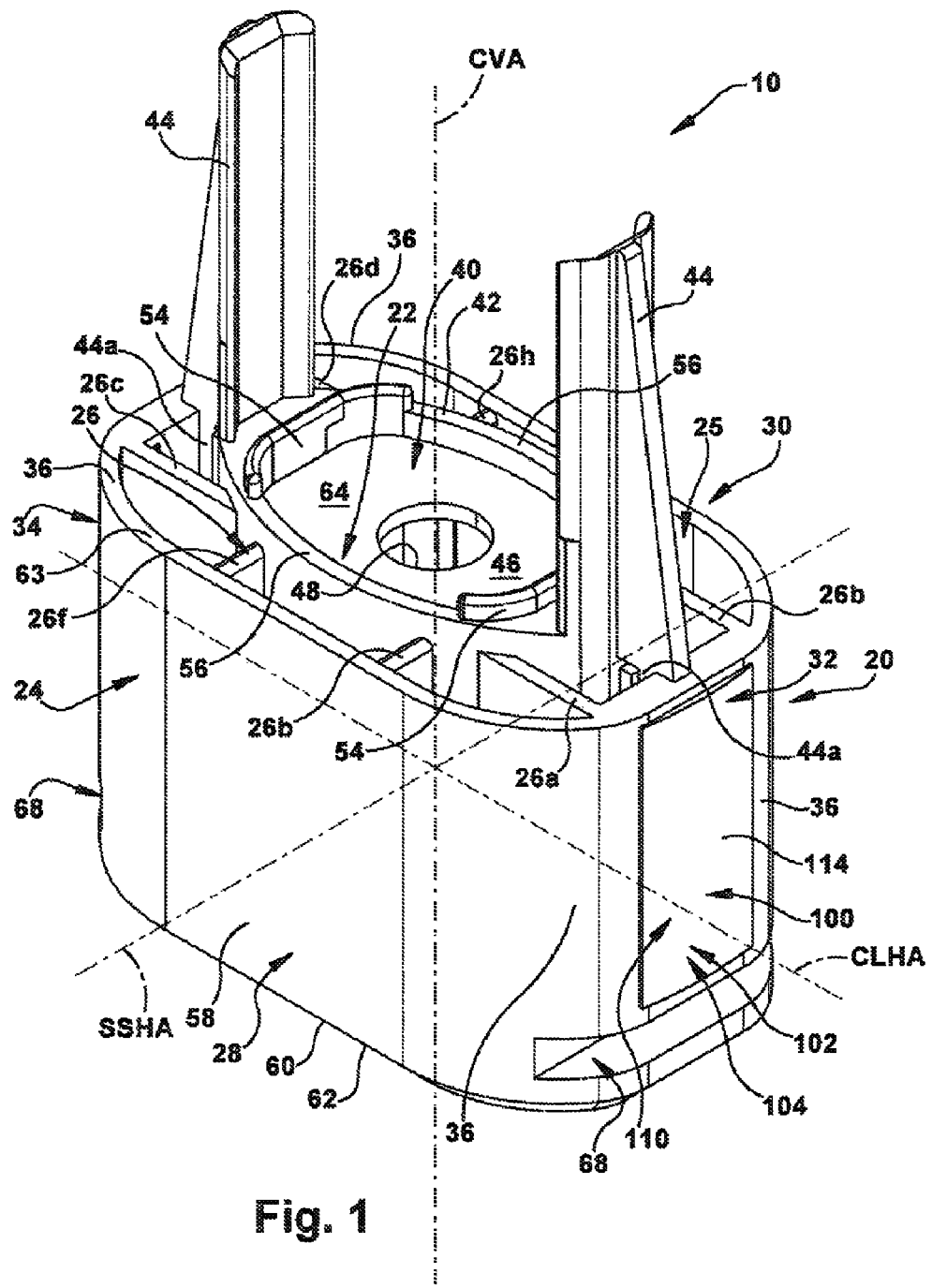
FIG. 1 is a schematic perspective view of a first exemplary embodiment of a product holding puck of the present disclosure.
Figure 2:
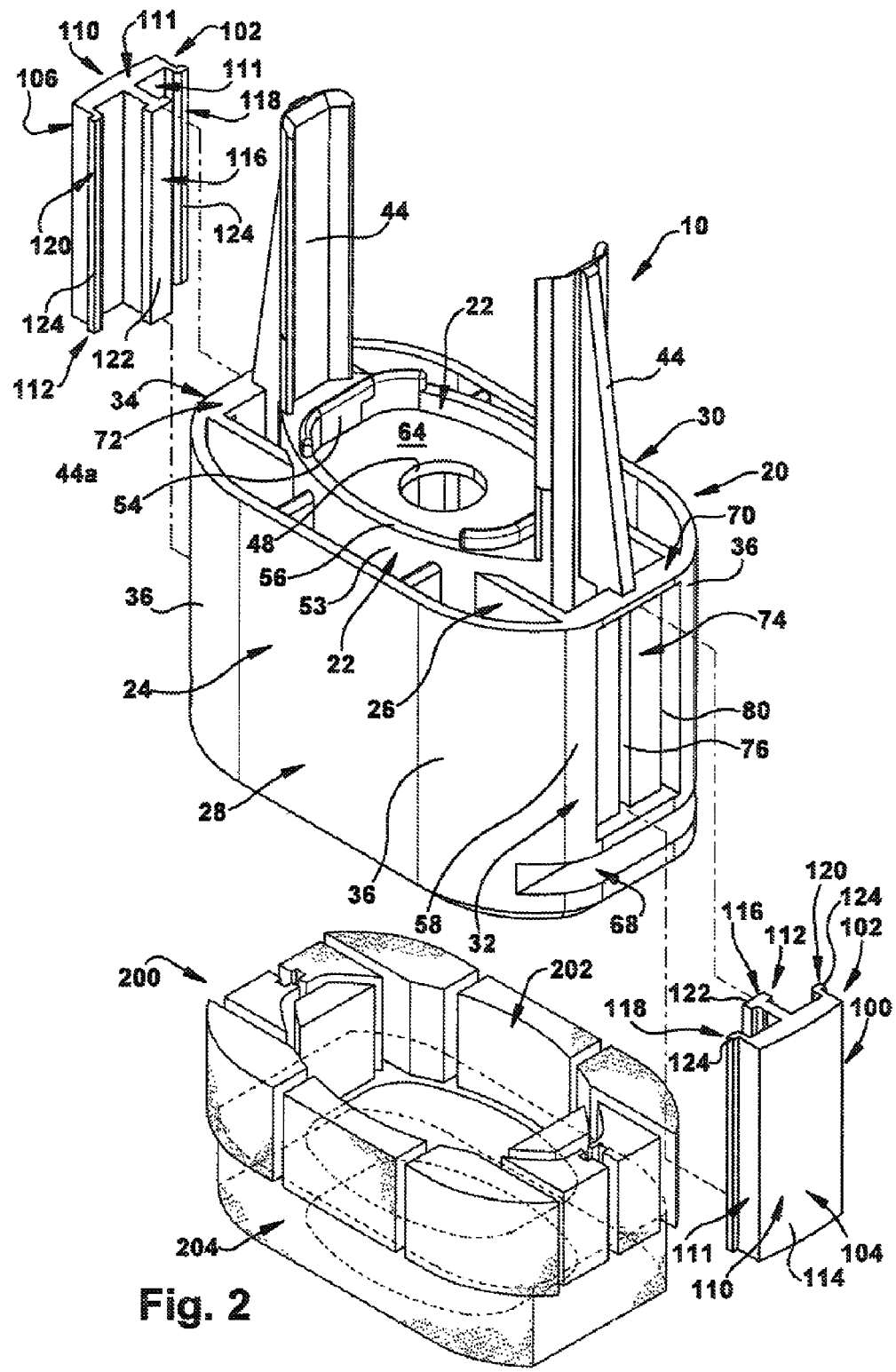
FIG. 2 is a schematic exploded perspective view of the product holding puck of FIG. 1.
Figure 3:
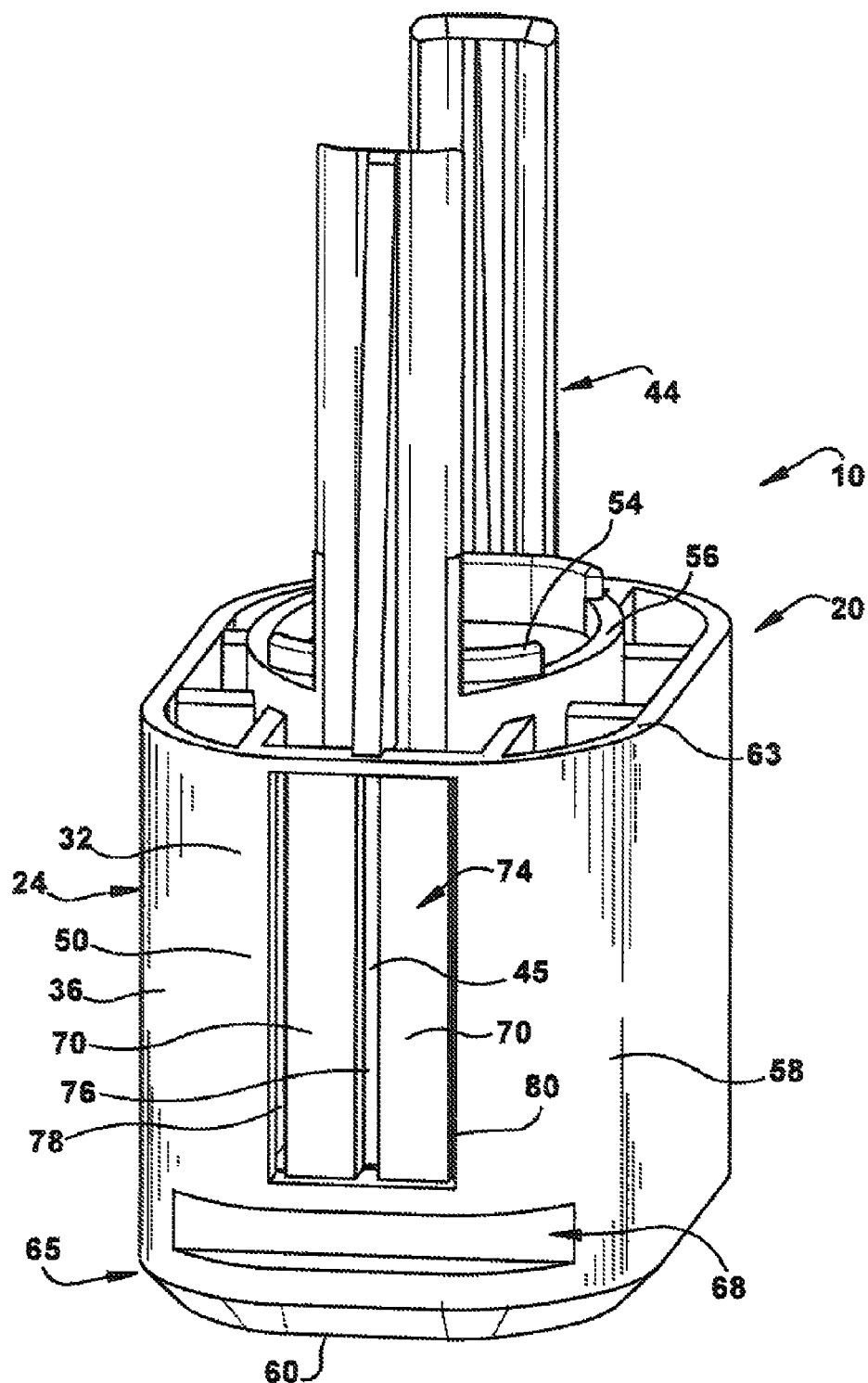
FIG. 3 is a schematic side elevation view of the product holding puck of FIG. 1.
Figure 4:
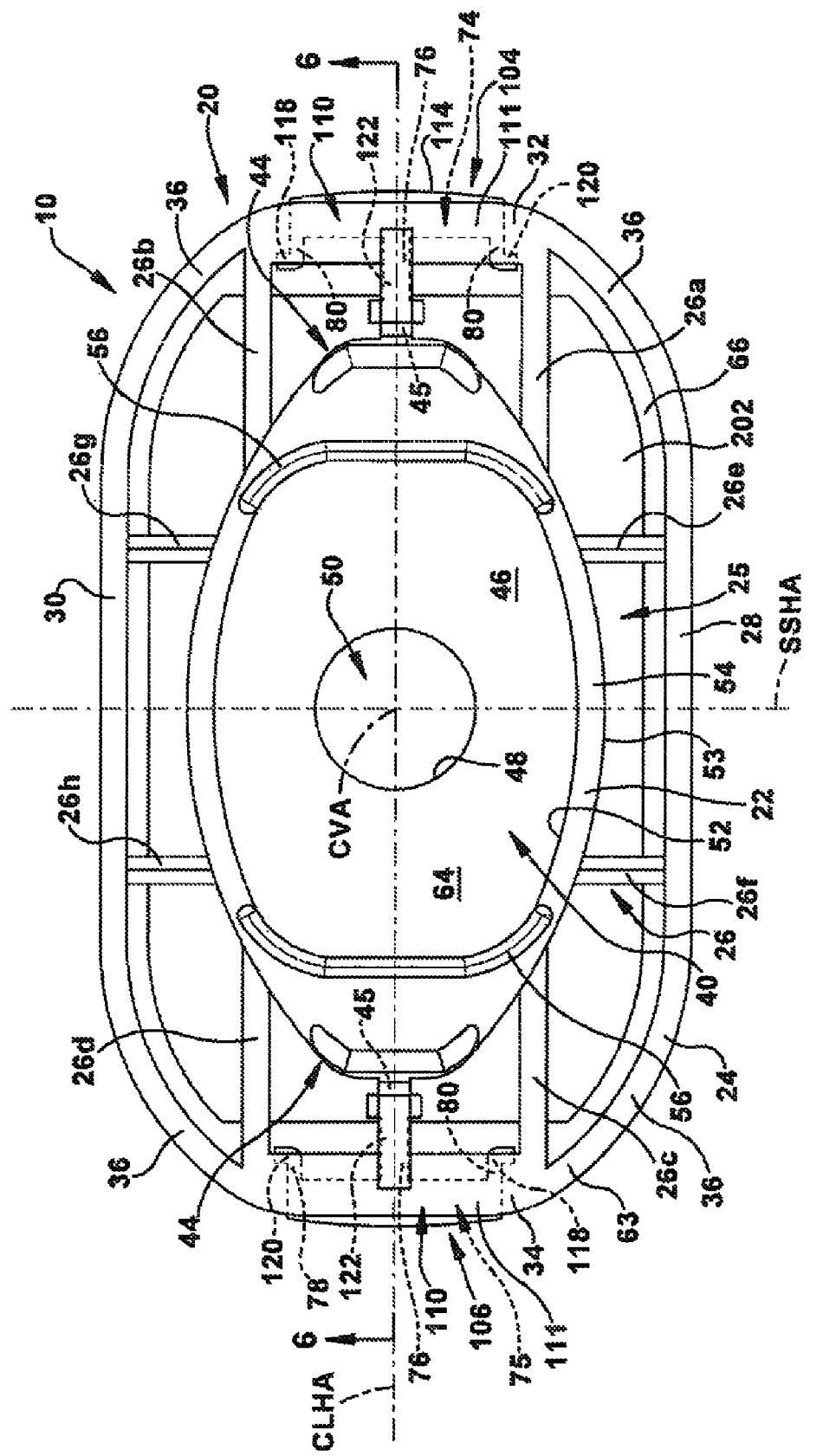
FIG. 4 is a schematic top plan view of the product holding puck of FIG. 1.
Figure 5:
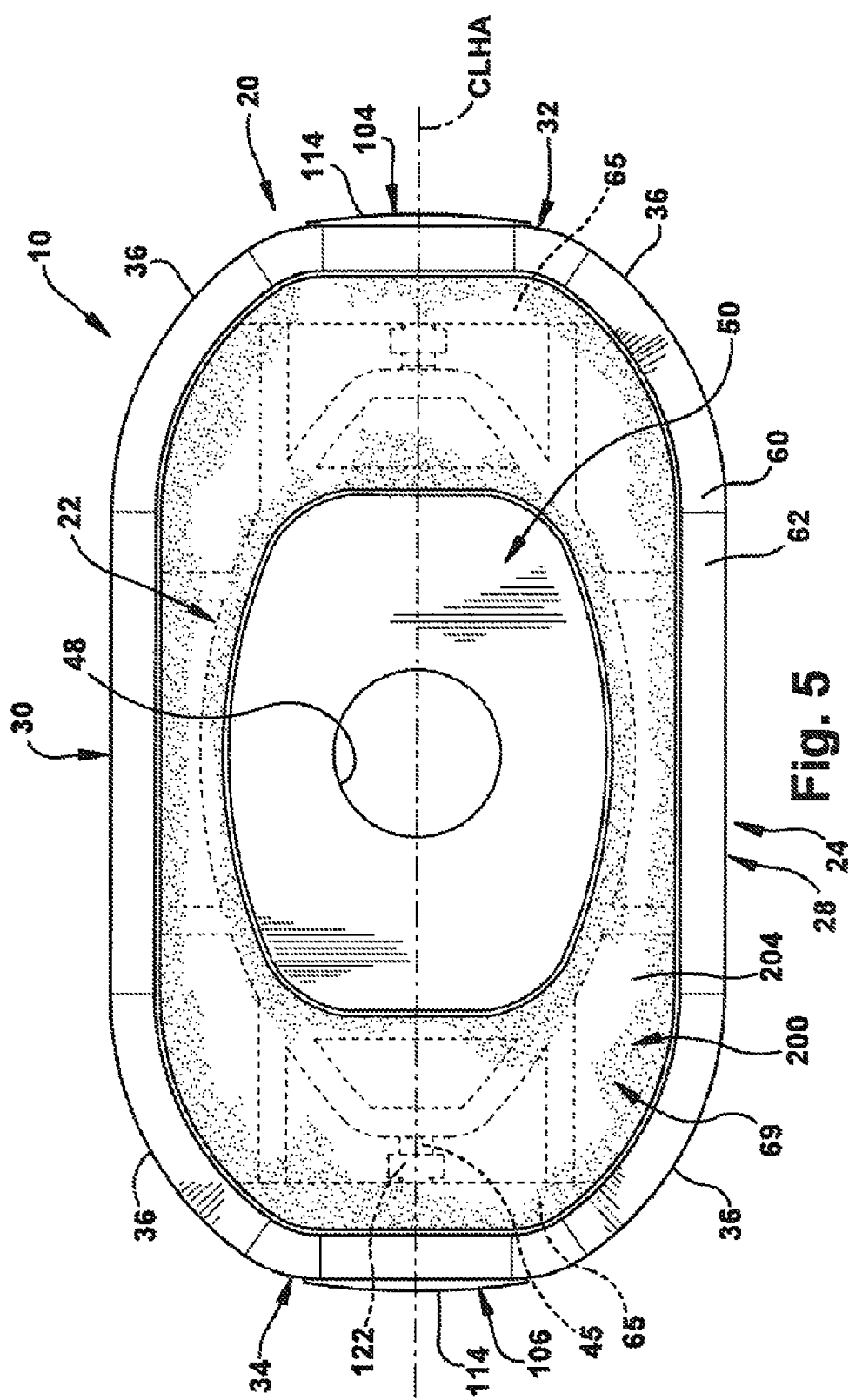
FIG. 5 is a schematic bottom plan view of the product holding puck of FIG. 1.
Figure 6:
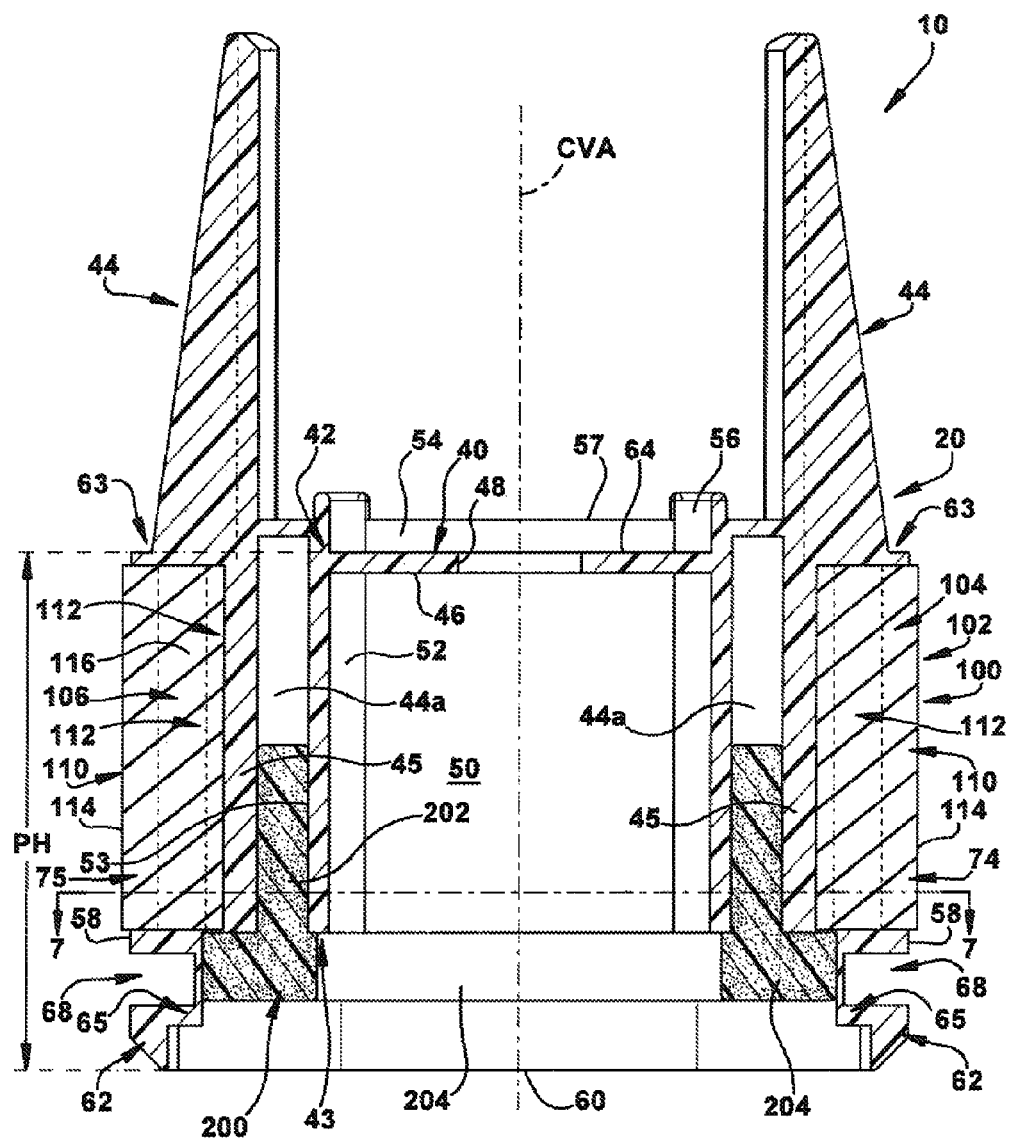
FIG. 6 is a schematic sectional view of the product holding puck of FIG. 1 as seen from a plane indicated by the line 6-6 in FIG. 4.

Turning to the drawings, one exemplary embodiment of a product holding puck of the present disclosure is shown generally at 10 in FIGS. 1-9. As can best be seen in FIG. 2, the product holding puck 10 includes a base 20, a bumper structure 100 and potting compound 200. As can be seen, the base 20 is comprised generally of an inner wall 22, an outer wall 24, a plurality of vertical or axially extending ribs 26 extending between or bridging the inner and outer walls. The inner and outer walls 22, 24 share a common central vertical axis CVA (FIGS. 1 & 6). The terms axially, radially; outwardly, inwardly, and the like as used herein shall refer to the directions with respect to the central vertical axis CVA. For example, with respect to the central vertical CVA, the outer wall 24 is spaced radially outwardly of the inner wall 22. When viewed in top plan view (FIG. 4), the outer wall 24 is generally rectangular in shape, while the inner wall 22 is generally oval in shape. The outer wall 24 includes first and second longer sides 28, 30 which are substantially parallel to a central longitudinal horizontal axis CLHA (FIGS. 1, 3 & 4) of the base 20. As can be seen in FIG. 3, the central longitudinal horizontal axis CLHA intersects and is orthogonal to the central vertical axis CVA. The outer wall 24 also includes third and fourth shorter sides 32, 34 which are substantially orthogonal to the central longitudinal horizontal axis CLHA. Four arcuate corner regions 36 extend between the first and second longer sides 28, 30 and the third and fourth shorter sides 32, 34.

Figure 8:
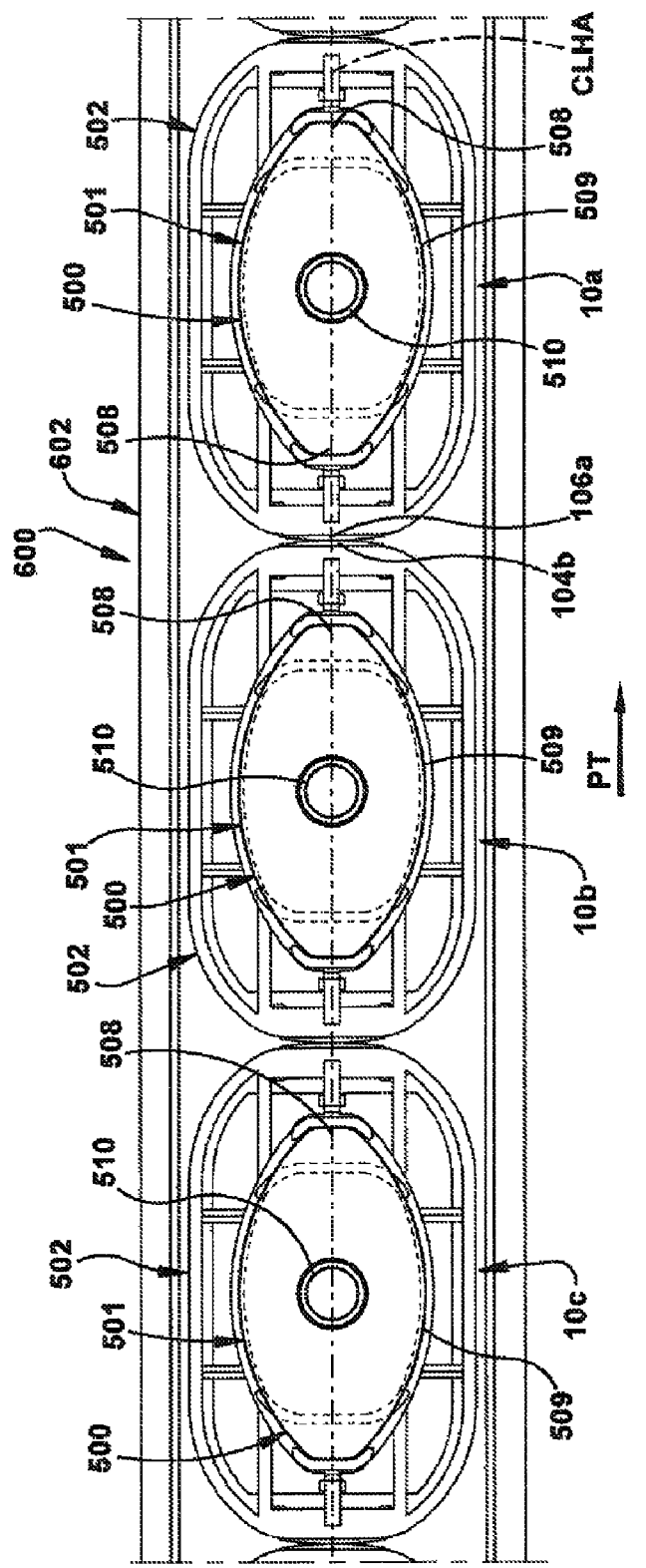
FIG. 8 is a schematic top plan view of three representative product holding pucks of the present disclosure on a representative conveyor line of a production line to depict the contact of successive pucks as they move along a path of travel on the conveyor line and specifically, the contact of respective first and second sound reducing bumpers of a puck with respective noise reducing bumpers of adjacent pucks in front of and to the rear of the puck.
Figure 9:
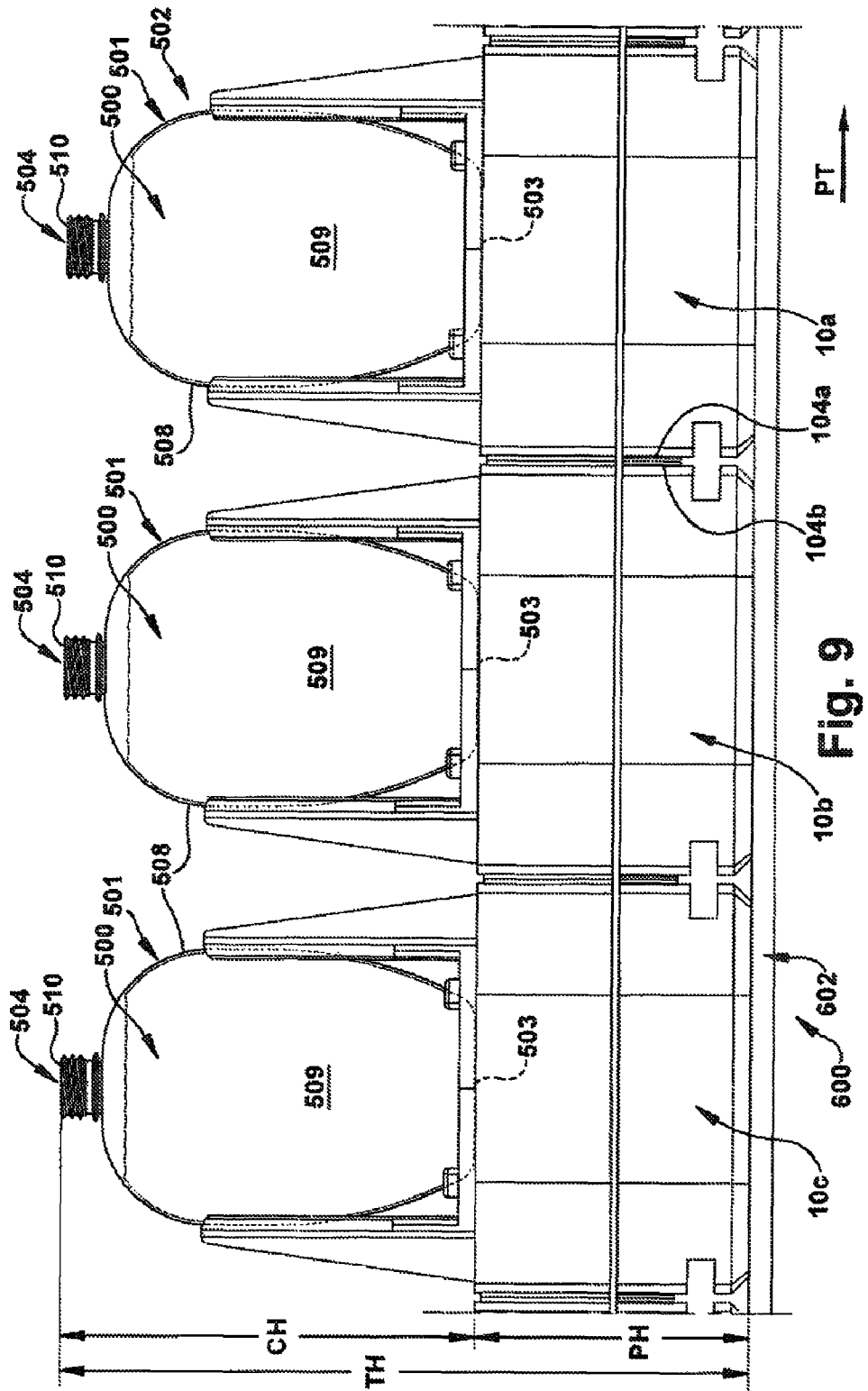
FIG. 9 is a schematic front elevation view of the three representative product holding pucks on the representative conveyor line of FIG. 8.

As can best be seen in FIG. 1, the base 20 of the product holding puck 10 further includes a product support platform 40 extending radially across an upper end portion 42 of the inner wall 22 and product stabilizing uprights 44 extending axially upwardly from the product support platform 40. The product support platform 40 and the product stabilizing uprights 44 releasably secure a product container 501 (FIGS. 8 and 9) to be filled and/or labeled in an automated production line for product filling, capping and/or labeling purposes. A representative product container 501 includes a product 500 filled in the container. The product 500 may be a liquid such as water, soft drink, or shampoo, as shown in FIG. 9, tablets/capsules, powder, or the like. An automated production line 600 (only a portion of which is shown in FIGS. 8 and 9) may fill the container 501 as supported in the puck 10 with product 500, may apply a label to the container, apply a cap, apply a safety seal, imprint an indicia on the container, etc. as required. A portion of the production line 600 wherein the pucks 10 and associated supported product containers 501 move along a conveyor 602 of the production line is also shown schematically in FIGS. 8 and 9. The combination of a puck 10 support product 501 releasably secured for filling, labeling, and/or capping/sealing operations is schematically shown as 502 in FIGS. 8 & 9.

As can best be seen in FIGS. 4 and 9, the upper end portion 42 of the product support platform 40 includes a recessed planar horizontal region 46 that supports a bottom surface 503 of the container 501. A central opening 48 in the planar horizontal region 46, which is substantially concentric with the central vertical axis CVA, allows drainage of any contents (i.e., liquid such as shampoo) dispensed into the container 501 that inadvertently misses the container opening 504 or overflows the container and spills down the outside of the container. Any spilled contents will drain through the opening 48 and exit the puck 10 via a central cavity 50 defined by an inner surface 52 of the inner wall 22. An upwardly axially extending ridge 54 and two axially extending arcuate rib portions 56 of the product support platform 40 define an upper extent 57 (FIG. 6) of the inner wall 22 and provide additional radial or lateral support and confinement for a bottom portion 506 of the container 501.

The product stabilizing uprights 44 support opposite short sides 508 of the container 501. Of course, it should be recognized that the configuration of the platform 40 and the uprights 44 are dependent on the configuration of the container 501 to be supported, the nature of the contents of the container, the type of label to be applied to the container, if any, etc. For example, a short, squat container may not require side support uprights 44 at all. Additionally, the dimensions of the base are selected such that the height and position of container opening 504 with respect to an outer surface 58 of the outer wall 24 are precisely determined for filling, labeling, and/or capping/sealing purposes. For example, an axial extent or height PH. (FIGS. 6 & 9) of the puck 10 from a bottom surface 60 defined by a lower or bottom end 62 of the outer wall 24 of the puck to an upper surface 64 of the planar horizontal portion 46 of the product support platform 40 is precisely known by virtue of the design of the puck 10.

Also precisely known is a height CH (FIG. 9) from the bottom surface 503 of the container 501 to an upper end or edge 510 of the container 501 that defines the container opening 504. Thus, the sum of the puck height PH and the container height CH provide an accurate measure of the overall height TH from a bottom surface 60 of the puck 10 to the upper edge 510 of the container 501 for filling purposes.

Similarly, the dimensions of and between the first and second long sides 28, 30 and the dimensions of and between the third and fourth short sides 32, 34 of the outer wall 24 of the puck 10 are known, as are the dimensions of short and long sides 508, 509 and the opening 504 of the container 501, thus, positions of the long sides 509 of the container are accurately know for labeling purposes and the position of the opening 504 is known for capping and application of tamper-resistant safety seal or seals, etc.

In one exemplary embodiment, the plurality of ribs 26 (FIG. 4) extend vertically in a generally annular cavity 25 formed between inner and outer walls 22, 24 include, in one exemplary embodiment: a) four vertically oriented ribs 26a, 26b, 26c, 26d extending between the inner and outer walls in a direction substantially parallel to the central longitudinal horizontal axis CLHA; and b) four vertically oriented ribs 26e, 26f, 26g, 26h extending between an outer surface 53 of the inner wall 22 and an inner surface 59 of the outer wall 24 in a direction substantially parallel to a short side horizontal axis SSHA, the short side horizontal axis being substantially orthogonal to the central longitudinal horizontal axis and substantially parallel to the third and fourth sides 32, 34 of the outer wall.

At their respective upper ends, the plurality of ribs 26 terminate substantially even with an upper surface or end 63 of the outer wall 24. A lower portion 65 of the outer wall 24 extending below a lower surface or end 43 of inner wall 22 has increased thickness or width extending radially inwardly and defining a shoulder 66 (FIG. 4). At their respective lower ends, the plurality of ribs 26 terminate substantially even with the shoulder 66 of the outer wall 24 and the lower surface or end 43 of the inner wall 22. In the regions of the third and fourth shorter sides 32, 34 and adjacent corners 36, a pair of horizontal guide bar recesses 68 are formed in the outer surface 58 of the outer wall 24 in the lower portion 65 of the outer wall. The pair horizontal guide bar recesses 68 are provided for the purpose of allowing the puck to be picked up, reoriented, and/or guided along conveyor guide bars as it moves from workstation to workstation along the production line 600.

Bumper Structure 100

Figure 7:
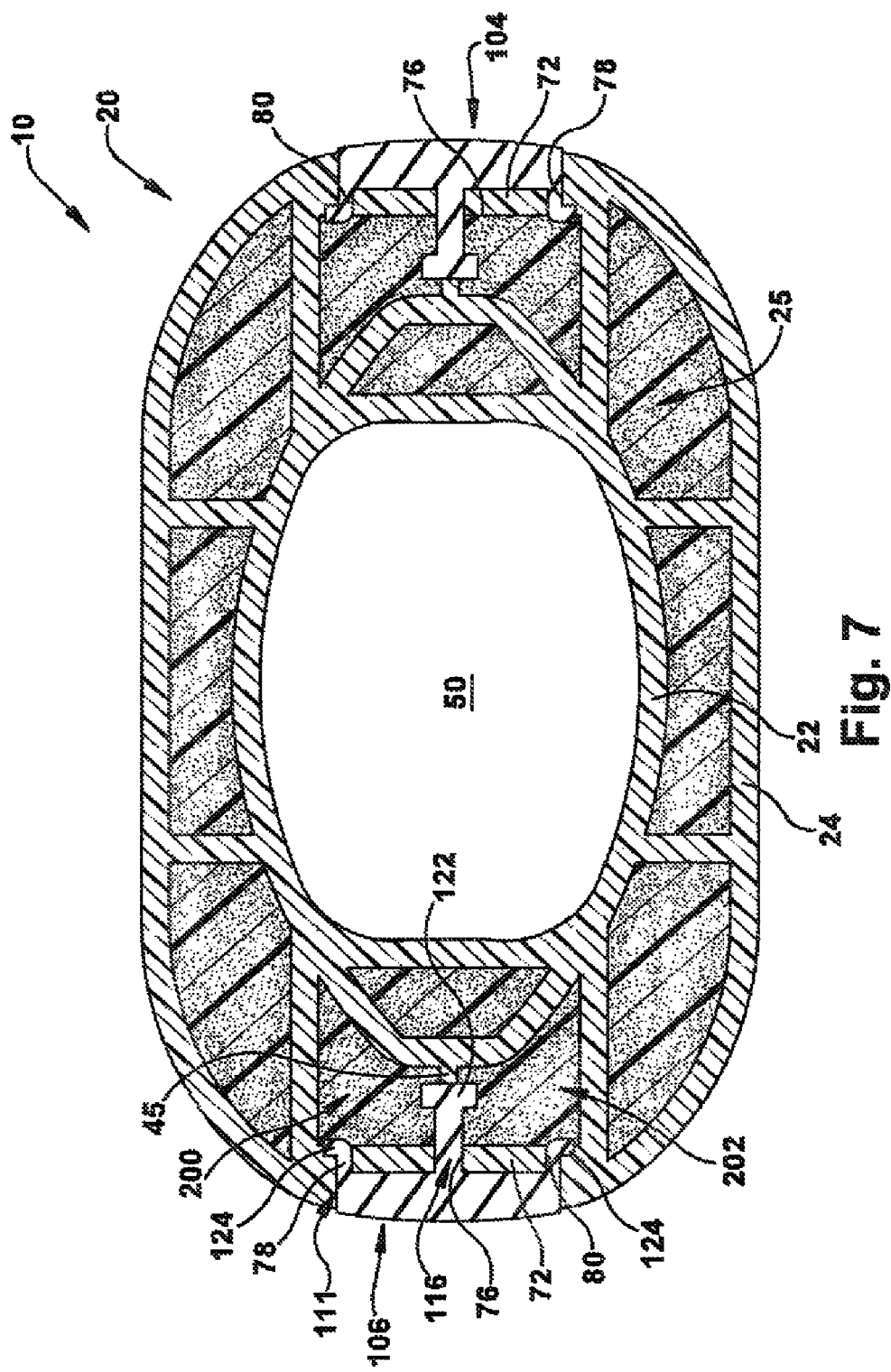
FIG. 7 is a schematic sectional view of the product holding puck of FIG. 1 as seen from a plane indicated by the line 7-7 in FIG. 6.

As can best be seen in FIGS. 2 and 7, the bumper structure 100 includes a plurality of noise reducing bumpers 102. In one exemplary embodiment, the bumper structure 100 includes first and second noise reducing bumpers 104, 106 permanently affixed to the base 20 via the potting compound 200. The outer wall 24 in the region of the third and fourth short sides 32, 34 define regions 70, 72 of increased outer wall width or thickness compared to the first and second longer sides 28, 30. Each of the increased width regions 70, 72 defines a pair of recessed region 74, 75, which are spaced circumferentially apart. The increased width regions 70, 72 also each define three vertically oriented slots or openings 76, 78, 80 which are axially aligned with respective ones of the recessed regions 74, 75 and which passing through the outer wall 24. The recessed regions 74, 75 and three vertical openings 76, 78, 80 provide a seating region and support for the bumper structure 100. The first bumper 104 is seated in the first recessed region 74 and the second bumper 106 is seated in the second recessed region 75.

Each bumper 104, 106 includes a body 110 and a support member 112. A portion 111 of the body that faces or is closer to the outer wall 24 is disposed or seated in the recessed regions 74, 75. An outer face 114 of the body 110 of each bumper extends radially outwardly beyond the outer surface 58 of the outer wall 24. In one exemplary embodiment, the each bumper support member 112 includes three vertically extending, circumferentially spaced apart arms, a central arm 116, and a pair of arms 118, 120, one on either side of the central arm 116. The central arm 116 extends through the center vertical opening 78 of the outer wall 24 and as a T-shaped inwardly extending head portion 122. The T-shaped head portion 122 abuts a vertical boss 45 formed by a lower extension 44a of the product stabilizing uprights 44 in a region between the inner and outer walls 22, 24. The T-shaped head portion 122 is in communication with and partially within the cavity 25 formed by the inner and outer walls 22, 24. The flanking arms 118, 120 include L-shaped portions 122, 124 (FIG. 2) that extend though respective vertical openings 76, 80 and therefore are in communication with and partially within the cavity 25. At least portions of the central arm 116 and the pair of flanking arms 118, 120 are in contact with and are affixed to the potting material 200. The adhering of the central arm 116 and the flanking arms 118, 120 and the potting material 200 and, in particular, the potting material portion 202 facilitates positionally securing the bumpers 104, 106 with respect to the base 20.

The bumpers 104, 106 extend slightly outwardly of the outer surface 58 of the outer wall 24 and, in one exemplary embodiment the bumpers are disposed in the third and fourth shorter sides 32, 34 of the outer wall 24. As can best be seen in Figure, the bumpers 104, 106, in top plan view are arcuate, thereby extending outwardly from the outer surface 28 of the outer wall 24 to a greater extent in a middle region of the bumper than at the edges of the bumper adjacent the outer wall outer surface.

The bumpers 104, 106 function as endpieces of the puck 10 when the puck is moving in a longitudinal direction along the central longitudinal axis CLHA. That is, if a plurality of pucks 10a, 10b, 10c are oriented long their respective central longitudinal axes CLHA as shown in FIGS. 8 & 9 on a conveyor line 602, the bumpers are aligned such that the second or trailing bumper 106a of puck 10a contacts the first or leading bumper 104b of puck 10b. In one exemplary embodiment, the bumpers 104, 106 are fabricated of an elastomeric material for example such as rubber or a thermoplastic elastomer (TPE), while the base 20 is fabricated of a hard plastic having excellent durability properties such as hard polypropylene material. One suitable thermoplastic elastomer (TPE) for the bumpers 104, 105 would be SANTOPRENE® TPE.

The bumpers 104, 106 are fabricated of a material of a softer material than the base 20, i.e., a material having a lower durometer value than the base material. Because the bumpers 104, 106 are fabricated of a softer material than the base 20, in a collision between a puck and an object, be the object a stationary object such as a conveyor guide bar or another puck, the collision occurs between one of the bumpers 104, 106 and the object, less noise will be generated than a comparable collision between the base 20 and the object. Thus, advantageously, the bumpers 104, 106 serve a noise-reducing function.

Stated another way, because the bumpers 104, 106 extend outwardly of the outer wall 24, when adjacent pucks, for example, pucks 10a, 10b, 10c are oriented as shown in FIGS. 14A & 15B on a conveyor line 602, inevitable collisions between adjacent pucks as they move along a path of travel PT on the conveyor line 602, will be bumper-to-bumper collisions, as opposed base-to-base collisions. Accordingly, because of the elastomeric material of the bumpers 102, 104, noise generated by collisions between respective bumpers, as opposed to collision between puck bases, is substantially reduced. Even if a plurality of pucks that are randomly oriented with respect to the short and long sides 28, 30, 32, 34 and thus not all collisions between pucks will be bumper-to-bumper collisions, noise from puck collisions will still be reduced to a degree because a portion of the collisions will be bumper-to-base collisions and such collisions will result in less noise than a corresponding base-to-base collisions.

Potting Material 200

As can best be seen in FIGS. 2, 6 & 7, in one exemplary embodiment, the potting material 200 is a thermoplastic elastomer (TPE) material, which like the bumpers 104, 106, is a softer durometer material than the base 20. One suitable thermoplastic elastomer (TPE) for the potting material 200 would be SANTOPRENE® TPE.

In addition to securing the bumpers 104, 106 with respect to the base 20, the potting material 200 advantageously also performs a noise reducing function to further reduce noise resulting from puck collisions with other pucks and with other equipment such as conveyors guide bars, etc. of the production line 600.

A portion 202 of the potting compound or material 200 is disposed in a lower portion of the cavity 25 between the inner and outer walls 22, 24. The potting material 200 contacts and affixes to at least a portion of the support member arms 116, 118, 120 to positionally secure each of the first and second bumpers 104, 106 with respect to the base 20. With respect to the central arm 116, the potting material 200 contacts, surrounds and affixes the T-shaped inwardly extending head portion 122 of the central arm 116a to positionally secure the bumpers 104, 106 with respect to the base 20. With respect to the flanking arms 118, 120, the potting material 200 contacts and affixes to the planar ends 118a, 120a of the arms to positionally secure the bumpers with respect to the base 20.

As is best seen in FIGS. 5 & 6, another portion 204 of the potting compound 200 extends axially downwardly below the bottom surface 43 of the inner wall 22 forming a generally annular shaped ring portion 202. A region of the puck 10 within the outer wall 24 and axially below the outer wall shoulder 66 and below the lower surface 43 of the inner wall 22 defines a cylindrical cavity 69 (FIG. 5). Because of radial gaps between the outer all shoulder 66 and the outer surface 53 of the inner wall 22, the cylindrical cavity 69 with the annular cavity 25 between the inner and outer walls 22, 24, the cavities 69, 25 are in fluid communication. Thus, the potting material 200 is integral with respect to potting material portions 202, 204. Stated another way, when the potting material is injected into the base 25, the potting material flows within and between the cavities 69, 25 forming the first and second potting material portions 202, 204 integrally.

Method of Fabrication of Product Holding Puck 10

It should be recognized that the product holding puck of the present disclosure may fabricated in a variety of ways, as would be understood by one of ordinary skill in the art. In one exemplary embodiment and without limitation, the puck 10 is fabricated using a two-shot injection molding process. In the first shot of the injection molding process, the base 20 is formed having the two bumper recessed regions 74, 75 and the associated vertical openings 76, 78, 80. Next, the bumpers 104, 106, which are separately fabricated and cut to appropriate length in an extrusion process, are inserted into the base 20. For each bumper 104, 106, the body 110 of the bumper is disposed in the bumper recessed regions 74, 75 of the base 20. For each bumper 104, 106, the respective arms 116, 118, 120 of the bumper support member 112 are inserted into the respective vertical openings 76, 78, 80 of the base 20.

After insertion of the bumpers 104, 106 into the base 20, in the second shot of the injection molding process, the thermoplastic elastomer potting material 200 is injected into the base 25. The portion 202 of the potting material 200 that is disposed between the inner and outer walls 22, 24 permanently secures the bumpers 104, 106 in place with respect to the base 20. The portion 204 of the potting material 200 this is disposed axially below the inner wall 22 forms an annular ring and provides additional noise-reducing properties to the puck 10.

Exemplary Dimensions of Product Holding Puck 10

The size and configuration of the product holding puck of the present disclosure will be determined by a number of factors including, for example, the configuration, size, dimensions, weight of the product to be held by the puck, stability and positioning requirements mandated by the production line 600 in terms of product filling, labeling, application of cap or safety seal, etc., stability requirements mandated by transportation of the product along the conveyor line 602, etc. Thus, there is no "standard" configuration of the pucks. By way of example and for illustration purposes only and without limitation, a set of dimension for the puck is provided as follows: axial height of puck outer wall—3.15 in., length of puck along central longitudinal horizontal axis CLHA (including bumpers)—4.88 in., length of puck outer wall along central longitudinal horizontal axis CLHA (not including bumpers)—4.76 in., width of puck outer wall along short side horizontal axis SSHA—2.77 in., width of bumper—1.04 in., axial height of bumper 2.22 in., length of puck outer wall longer side along central longitudinal horizontal axis CLHA (not including corners)—2.65 in., and with of puck outer wall shorter side along short side horizontal axis SSHA (not including corners)—1.39 in.

As used herein, terms of orientation such as axially, radially, circumferentially, outwardly, inwardly upper, lower, forward, etc., are provided for convenience purposes and relate generally to the orientation shown in the Figures. Such orientation terms are not intended to limit the scope of the present disclosure or the claims appended hereto.

What have been described above are examples of the present disclosure/invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A product holding puck comprising:
   a) a base including an outer wall and a radially spaced apart inner wall defining a cavity between the outer and inner walls, the outer and inner walls extending axially about a central vertical axis, the outer wall being radially outwardly of the inner wall, an outer surface of the outer wall defining at least one opening aligned with the at least one recessed region and extending through the outer wall;
   b) at least one bumper including a body and a support member, the support member extending axially through the at least one opening of the outer wall and the body including an outer face that extends radially outwardly of the outer surface of the outer wall; and
   c) potting material disposed in the cavity, the potting material contacting the support member of the at least one bumper to positionally secure the at least one bumper with respect to the base.

2. The product holding puck of claim 1 wherein the outer surface of the outer wall includes at least one recessed region, the at least one opening aligned with the at least one recessed region.

3. The product holding puck of claim 2 wherein a portion of the body of the at least one bumper facing the outer wall is disposed in the at least one recessed region.

4. The product holding puck of claim 3 wherein the at least one recessed region induces a first recessed region and a circumferentially spaced apart second recessed region; the at least one opening includes a first opening aligned with the first recessed region and a second opening aligned with the second recessed region.

5. The product holding puck of claim 4 wherein the at least one bumper includes a first bumper and a circumferentially spaced apart second bumper, the first bumper including a first body and a first support member, the first support member extending radially through the first opening of the outer wall and a portion the first body facing the outer wall disposed in the first recessed region of the outer surface of the outer wall, the first body of the first bumper including a first outer face that extends radially outwardly of the outer surface of the outer wall and the second bumper including a second body and a second support member, the second support member extending radially through the second opening of the outer wall and a portion of the second body facing the outer wall disposed in the second recessed region of the outer surface of the outer wall, the second body of the second bumper including a second outer face that extends radially outwardly of the outer surface of the outer wall.

6. The product holding puck of claim 5 wherein the outer wall when viewed in top plan view is generally rectangular with respect to a central longitudinal horizontal axis that is orthogonal to the central vertical axis, the central longitudinal horizontal axis being substantially parallel to longer first and second sides of the outer wall and substantially orthogonal to shorter third and fourth sides of the outer wall and further wherein the first recessed region is formed in the shorter third side of the outer wall and the second recessed region is formed in the shorter fourth side of the outer wall.

7. The product holding puck of claim 6 wherein the first outer face of the first bumper extends radially outwardly of an outer surface of the shorter third side of the outer wall and the second outer face of the second bumper extends radially outwardly of an outer surface of the shorter fourth side of the outer wall.

8. The product holding puck of claim 6 wherein the shorter third and fourth sides of the outer wall each define respective regions of increased radial thickness and each of the respective first and second openings include three axially extending apertures that extend axially through the respective regions of increased radial thickness and each of the first and second bumper support members including three arms extending axially through respective ones of the three apertures.

9. The product holding puck of claim 1 wherein the outer wall when viewed in top plan view is generally rectangular with respect to a central longitudinal horizontal axis that is orthogonal to the central vertical axis, the central longitudinal horizontal axis being substantially parallel to longer first and second sides of the outer wall and substantially orthogonal to shorter third and fourth sides of the outer wall.

10. The product holding puck of claim 9 wherein the shorter third and fourth sides of the outer wall each include a guide rail recess extending substantially orthogonally to the radial longitudinal axis.

11. The product holding puck of claim 1 wherein a durometer hardness scale value of the at least one bumper is lower than a durometer hardness scale of the base.

12. The product holding puck of claim 1 wherein a durometer hardness scale value of the petting material is lower than a durometer hardness scale value of the base.

13. The product holding puck of claim 1 wherein a plurality of ribs extend between an inner surface of the outer wall and an outer surface of the inner wall.

14. The product holding puck of claim 13 wherein the plurality of ribs extend axially from an upper surface of the outer wall to a lower surface of the inner wall of the base.

15. The product holding puck of claim 1 wherein an upper portion of the inner wall includes a radially extending product support platform.

16. The product holding pick of claim 1 wherein an upper portion of the inner wall includes a pair of generally vertically extending product stabilizing uprights.

17. A product holding puck comprising:
a) a base including an outer wall and a radially spaced apart inner wall defining a cavity between the outer and inner walls, the outer and inner walls extending axially about a central vertical axis, the outer wall being radially outwardly of the inner wall and defining at least one recessed region and at least one opening respectively aligned with the at least first recessed region and extending through the outer wall;
b) at least one bumper including a body and a support member, the support member extending axially through the at least one opening of the outer wall and the body including an outer lace that extends radially outwardly of the outer surface of the outer wall; and
c) potting material disposed in the cavity and extending through the outer wall to define at least one bumper including a body and a support member, the support member extending axially through the at least one opening of the outer wall and the body disposed in the at least one recessed region of the outer wall, the body of the at least one bumper including an outer face that extends radially outwardly of the outer surface of the outer wall.

18. The product holding puck of claim 17 wherein: the at least one recessed region includes a first recessed region and a circumferentially spaced apart second recessed region, the at least one opening includes a first opening aligned with the first recessed region and a second opening aligned with the second recessed region; and the at least one bumper includes a first bumper and a second bumper spaced circumferentially apart, the first bumper including a first body and a first support member, the first support member extending axially through the first opening of the outer wall and the first body disposed in the first recessed region of the outer surface of the outer wall, the first body of the first bumper including a first outer face that extends radially outwardly of the outer surface of the outer wall and the second bumper including a second body and a second support member, the second support member extending axially through the second opening of the outer wall and the second body disposed in the second recessed region of the outer surface of the outer wall, the second body of the second bumper including a second outer face that extends radially outwardly of the outer surface of the outer wall.

19. The product holding puck of claim 17 wherein an upper portion of the inner wall includes a radially extending product support platform.

20. The product holding puck of claim 17 wherein an upper portion of the inner wall induces a pair of generally vertically extending product stabilizing uprights.

* * * * *